(12) United States Patent
Morita et al.

(10) Patent No.: US 8,153,202 B2
(45) Date of Patent: Apr. 10, 2012

(54) METHOD OF MANUFACTURING A LAYERED SILICONE COMPOSITE MATERIAL

(75) Inventors: Yoshitsugu Morita, Ichihara (JP); Tomoko Kato, Ichihara (JP); Hiroji Enami, Ichihara (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 13/009,982

(22) Filed: Jan. 20, 2011

(65) Prior Publication Data

US 2011/0143025 A1 Jun. 16, 2011

Related U.S. Application Data

(62) Division of application No. 10/580,798, filed as application No. PCT/JP2004/017829 on Nov. 24, 2004, now Pat. No. 7,919,150.

(30) Foreign Application Priority Data

Nov. 28, 2003 (JP) ................................. 2003-400426

(51) Int. Cl.
 *B05D 5/00* (2006.01)
 *B05D 1/38* (2006.01)
 *B05D 3/10* (2006.01)
(52) U.S. Cl. ...................... 427/412.1; 427/164; 427/387
(58) Field of Classification Search .................. 427/162, 427/164, 387, 407.1, 412.1
 See application file for complete search history.

(56) References Cited

U.S. PATENT DOCUMENTS

| | | | |
|---|---|---|---|
| 4,991,574 A | | 2/1991 | Pocknell |
| 5,166,293 A | | 11/1992 | Okinoshima et al. |
| 5,585,445 A | | 12/1996 | Meguriya et al. |
| 5,714,265 A | * | 2/1998 | Meguriya et al. ............. 428/413 |
| 6,590,235 B2 | | 7/2003 | Carey et al. |
| 2001/0010371 A1 | | 8/2001 | Carey et al. |
| 2007/0134425 A1 | | 6/2007 | Morita et al. |

FOREIGN PATENT DOCUMENTS

| | | | |
|---|---|---|---|
| DE | 3712145 A1 | | 3/1988 |
| EP | 0003044 A1 | | 7/1979 |
| EP | 0300620 A1 | | 1/1989 |
| JP | 62-148901 A | | 7/1987 |
| JP | 62-239106 A | | 10/1987 |
| JP | 01-034370 A | | 2/1989 |
| JP | 05-069511 A | * | 3/1993 |
| JP | 05-069512 A | * | 3/1993 |
| JP | 2000-150968 A | | 5/2000 |

OTHER PUBLICATIONS

English language abstract for DE3712145 extracted from espacenet.com Aug. 28, 2006.
English language abstract for EP0003044 extracted from espacenet.com Aug. 24, 2006.
English language abstract for JP62-148901 extracted from Patent Abstracts of Japan.
English language abstract for JP62-239106 extracted from espacenet.com Aug. 28, 2006.
English language abstract for JP 1034370 extracted from espacenet.com Feb. 18, 2007.
English language abstract for JP 5069511 extracted from espacenet.com Aug. 28, 2006.
English language abstract for JP 5069512 extracted from espacenet.com Aug. 28, 2006.
English language abstract for JP200150968 extracted from espacenet.com Jun. 18, 2007.
Machine translation of JP 05-069511 A, generated Nov. 18, 2009, 11 pages.
Machine translation of JP 05-069512 A, generated Nov. 18, 2009, 13 pages.
International Preliminary Report on Patentability for PCT/JP2004/017829, May 29, 2005, 6 pages.

* cited by examiner

*Primary Examiner* — William Phillip Fletcher, III
(74) *Attorney, Agent, or Firm* — Howard & Howard Attorneys PLLC

(57) ABSTRACT

A method of manufacturing a layered silicone composite material comprising the steps of: applying a second addition-curable organopolysiloxane composition that contains a second adhesion promoter onto a first silicone layer that is formed by curing a first addition-curable organopolysiloxane composition containing a first adhesion promoter and where the first silicone layer has a hardness of less than JIS A 50; and forming a second silicone layer that has hardness of JIS A 50 or more by curing said second addition-curable organopolysiloxane composition.

9 Claims, No Drawings

METHOD OF MANUFACTURING A LAYERED SILICONE COMPOSITE MATERIAL

CROSS-REFERENCE TO RELATED APPLICATIONS

This present application is a divisional of Ser. No. 10/580,798, which was filed on May 26, 2006, and was issued as U.S. Pat. No. 7,919,150 B2, which claims priority to and all the advantages of International Application No. PCT/JP2004/017829, filed on Nov. 24, 2004, which claims priority to Japanese Patent Application No. JP 2003-400426, filed on Nov. 28, 2003.

TECHNICAL FIELD

The present invention relates to a method of manufacturing a layered silicone composite material, in particular, to a method of manufacturing a layered silicone composite material that has excellent adhesion to a substrate, wherein both layers are integrated into a single body via a strong adhesion on their interface.

BACKGROUND ART

It is known that elastic substances, such as, e.g., a silicone gel, possess excellent softness and stress-relaxation properties. However, a problem experienced with their use is associated either with low shape-preserving properties or low strength, or with tackiness that makes them difficult to handle in production. It has been proposed to solve the above problems by forming a layered silicone composite material consisting of a soft elastic underlayer and a relatively hard elastic material on the top of the soft layer. For example, Japanese Unexamined Patent Application Publication (hereinafter referred to as Kokai) S62-148901 and Kokai S62-239106 (equivalent to DE3712145) disclose an optical material in the form of a layered composite structure consisting of a plurality of elastic layers having different hardness. Kokai 2000-150968 (equivalent to U.S. Pat. No. 6,590,235) describes a layered silicone composite material for use as a cover for optical elements such as LEDs, wherein the aforementioned material also consists of a relatively soft inner silicone layer and a relatively hard outer silicone layer. However, when a layered silicone composite material is made from a curable silicone composition, and in particular, from a silicone composition curable via an addition reaction (hereinafter referred to as an addition-curable silicone composition), it becomes difficult to firmly interconnect the layers into a single body in view of the poor adhesion between the layers.

An attempt to solve the above problem is described in Kokai H5-69511 and Kokai H5-69512, where a method is proposed for forming a layered silicone composite material produced from a silicone gel substrate layer and a silicone elastomer or silicone resin surface layer by simultaneously curing curable silicone compositions of different specific gravity and miscibility. A drawback of the aforementioned method is that it is difficult to control the thickness and hardness of individual layers and that the interface between the layers has a non-uniform nature.

Kokai H1-34370 (equivalent to EP0300620) discloses a method, in which a layered structure is formed by interconnecting through adhesion a silicone elastomer layer and a silicone gel layers which are both in a cured state. Such a method, however, results in poor adhesion between the layers, as well as between the obtained layered structure and a substrate, if such a connection is required.

DISCLOSURE OF INVENTION

According to an embodiment, the present invention provides a method of manufacturing a layered silicone composite material comprising the steps of:
applying a second addition-curable organopolysiloxane composition that contains a second adhesion promoter onto a first silicone layer that is formed by curing a first addition-curable organopolysiloxane composition containing a first adhesion promoter and where the first silicone layer has a hardness of less than JIS A 50; and
forming a second silicone layer that has a hardness of JIS A 50 or more by curing said second addition-curable organopolysiloxane composition.

According to another embodiment, the invention provides a method of manufacturing a layered silicone composite material comprising the steps of:
applying a first addition-curable organopolysiloxane composition that contains a first adhesion promoter onto a second silicone layer that is formed by curing a second addition-curable organopolysiloxane composition containing a second adhesion promoter and where the second silicone layer has a hardness of JIS A 50 or more; and
forming a first silicone layer that has a hardness of less than JIS A 50 by curing said first addition-curable organopolysiloxane composition.

At least one of the first adhesion promoter and the second adhesion promoter may be represented by an organosilicon compound that contains in one molecule at least one alkoxy, at least one alkoxyalkoxy group, or both. Furthermore, it is recommended that at least one of the first adhesion promoter and the second adhesion promoter contains at least one silicon-bonded alkenyl group, at least one silicon-bonded hydrogen atom, at least one epoxy group, or a combination thereof.

At least one of the aforementioned first addition-curable organopolysiloxane composition and the second addition-curable organopolysiloxane composition may be free of inorganic fillers.

The layered silicone composite material of the invention is suitable for use in various optical elements, e.g., for the manufacture of the entire optical element or a part of such an element.

The method of the present invention makes it possible to obtain a layered silicone composite material composed of strongly interconnected silicone layers of different hardness, or to produce a layered structure by attaching the obtained composite material to a substrate. Since the method of the invention provides easy control of thickness and hardness of individual layers, it allows for the attainment of a layered silicone composite material that possesses the desired physical properties.

The layered silicone composite material obtained by the method of the invention possesses heat-resistant and light-resistant properties inherent in silicone. It can be used individually or in combination with a substrate for manufacturing various electric and electronic devices or optical elements.

The aforementioned first and second addition-curable organopolysiloxane compositions used in the method of the invention are compositions that are capable of cross-linking and curing organopolysiloxane under the effect of an addition reaction conducted between unsaturated silicon-doublebonded hydrocarbon groups and silicon-bonded hydrogen atoms in the presence of a hydrosilylation catalysts for addition reactions.

The first addition-curable organopolysiloxane composition may comprise:
- (A) an organopolysiloxane having an average of at least two silicon-bonded alkenyl groups per molecule;
- (B) an organopolysiloxane having an average of at least two silicon-bonded hydrogen atoms per molecule; and
- (C) a hydrosilylation catalyst for addition reactions; with the proviso that the first addition-curable organopolysiloxane composition cures to form a first silicone layer that has a hardness of less than JIS A 50.

The second addition-curable organopolysiloxane composition may comprise:
- (A') an organopolysiloxane having an average of at least two silicon-bonded alkenyl groups per molecule;
- (B) an organopolysiloxane having an average of at least two silicon-bonded hydrogen atoms per molecule; and
- (C) a hydrosilylation catalyst for addition reactions; with the proviso that the second addition-curable organopolysiloxane composition cures to form a second silicone layer that has a hardness of HS A 50 or more.

The following are examples of alkenyl groups directly bonded to silicon in components (A) and (A'): vinyl groups, allyl groups, butenyl groups, pentenyl groups, hexenyl groups, or similar $C_2$-$C_{10}$ alkenyl groups, as well as alkenylaryl groups, such as styryl groups. Among these, vinyl groups are preferable. Groups other than alkenyl groups that can be used in the aforementioned organopolysiloxane are the following univalent hydrocarbon groups: methyl groups, ethyl groups, propyl groups, butyl groups, pentyl groups, hexyl groups, heptyl groups, or similar $C_1$-$C_{10}$ alkyl groups; cyclopentyl groups, cyclohexyl groups, or similar cycloalkyl groups; phenyl groups, tolyl groups, xylyl groups, naphthyl groups, or similar aryl groups; benzyl groups, phenethyl groups, 3-phenylpropyl groups, or similar aralkyl groups; chloromethyl groups, 3-chloropropyl groups, 3,3,3-trifluoropropyl groups, nonafluorobutylethyl groups, or similar halogenated hydrocarbon groups. The aforementioned organopolysiloxane (A) and (A') that contain silicon-bonded alkenyl groups may have a linear, cyclic, partially-linear branched, or branched molecular structure. Although there are no special restrictions with regard to viscosity, it is recommended that organopolysiloxane (A) and (A') with a linear, cyclic, or partially-branched linear molecular structure have a viscosity of 20 to 100,000 mPa·s, preferably 100 to 10,000 mPa·s at 25° C.

The first addition-curable organopolysiloxane composition that is intended for the formation of the first silicone layer with hardness of less than JIS A 50 contains component (A) that preferably should have a linear or a partially-branched linear molecular structure, where component (A) with a linear molecular structure is more preferable. By using basically a linear-structure organopolysiloxane, it would be easier to reduce the hardness of the first silicone layer. On the other hand, by replacing component (A) having a linear or a partially-branched linear molecular structure with component (A) having a branched molecular structure, it would be possible to impart to a cured product improved properties of strength without impairing transparency.

On the other hand, the second addition-curable organopolysiloxane composition that is intended for the formation of the second silicone layer with hardness of JIS A 50 or more contains component (A') that preferably should have a branched molecular structure. By using an organopolysiloxane with a branched structure, it would be easier to increase hardness of the second silicone layer and thus to impart to the second silicone layer in a cured state improved strength and resistance to scratching.

It is recommended that component (A') with a branched structure in the second addition-curable organopolysiloxane composition be represented by a silicone resin having silicon-bonded alkenyl groups and expressed by the following general formula (I):

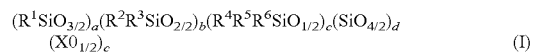

$$(R^1SiO_{3/2})_a(R^2R^3SiO_{2/2})_b(R^4R^5R^6SiO_{1/2})_c(SiO_{4/2})_d(XO_{1/2})_e \quad (I)$$

where $R^1$, $R^2$, $R^3$, $R^4$, $R^5$, and $R^6$ may be the same or different univalent hydrocarbon groups, however, the aforementioned silicon-bonded alkenyl groups should constitute 0.1 to 40 mole % of the total amount of $R^1$-$R^6$ groups per molecule; X is hydrogen atom or a $C_1$-$C_{10}$ alkyl group; "a" is 0 or a positive number' "b" is 0 or a positive number; "c" is 0 or a positive number; "d" is 0 or a positive number; and "e" is 0 or a positive number; however, "a" and "d" cannot be 0 at the same time. The following condition should be fulfilled in the aforementioned formula (I): c/(a+b+c+d) should be 0.1 to 0.9; d/(a+b+c+d) should be 0.1 to 0.9.

Univalent hydrocarbon groups that in formula (I) designated by $R^1$, $R^2$, $R^3$, $R^4$, $R^5$, and $R^6$, may be exemplified by methyl groups, ethyl groups, propyl groups, butyl groups, pentyl groups, hexyl groups, heptyl groups, or similar $C_1$-$C_{10}$ alkyl groups; cyclopentyl groups, cyclohexyl groups, or similar cycloalkyl groups; phenyl groups, tolyl groups, xylyl groups, naphthyl groups, or similar aryl groups; benzyl groups, phenethyl groups, 3-phenylpropyl, or similar aralkyl groups; chloromethyl groups, 3-chloropropyl groups, 3,3,3-trifluoropropyl groups, nonafluorobutylethyl groups, or similar halogenated hydrocarbon groups. Furthermore, the aforementioned silicon-bonded alkenyl groups, which are bonded directly to silicon atoms, may be represented by vinyl groups, allyl groups, butenyl groups, pentenyl groups, pentenyl groups, hexenyl groups, or similar alkenyl groups; as well as by styryl groups, or similar alkenylaryl groups. It is recommended that the aforementioned silicon-bonded alkenyl groups constitute 0.1 to 40 mole of the total amount of groups $R^1$ to $R^6$ in one molecule. Although there are no special restrictions with regard to the lower or upper allowable limits for use of the aforementioned silicon-bonded alkenyl groups, it is not desirable to use them in amounts of beyond the limits that may lead to a decrease in reactivity with respect to component (B). Furthermore, alkyl groups that in aforementioned formula (I) may be represented by X may constitute methyl groups, ethyl groups, propyl groups, butyl groups, pentyl groups, hexyl groups, heptyl groups, or similar $C_1$-$C_{10}$ alkyl groups. There are also no special restrictions with regard to the molecular weight of component (A') with the branched molecular structure, but in terms of polystyrene, the weight-average molecular weight (Mw) should be 300 to $10 \times 10^4$, preferably 500 to 10,000.

Groups other than hydrogen atoms in component (B) may be the same as those mentioned above with reference to univalent hydrocarbon. This organopolysiloxane may have a linear, cyclic, partially-branched linear, or branched molecular structure. It is recommended that organopolysiloxane (B) with a linear, cyclic, or a partially-branched linear molecular structure have viscosity of 1 to 10,000 mPa·s at 25° C.

In the first and second addition-curable organopolysiloxane compositions, component (B) should be used in an amount sufficient for curing the composition, preferably in an amount with 0.3 to 10 moles of the silicon-bonded hydrogen in component (B) for each 1 mole of alkenyl groups in component (A) or (A'). If in component (B) the amount of the silicon-bonded hydrogen is below the recommended lower level, the composition tends not to be sufficiently cured. If, on the other hand, the aforementioned amount exceeds the recommended upper level, the cured product tends to have low mechanical strength.

In the first and second addition-curable organopolysiloxane compositions, a hydrosilylation catalyst (C) for an addition reaction is used as a catalyst that accelerates cross-linking of the composition. Preferably the hydrosilylation catalyst is selected from a platinum, rhodium, iridium, palladium or ruthenium catalyst. Any suitable hydrosilylation catalyst may be utilized including for example, platinum catalysts such as a fine platinum powder, platinum black, chloroplatinic acid, alcohol-modified chloroplatinic acid, a complex of an olefin and a chloroplatinic acid, a complex of a chloroplatinic acid and an alkenyl siloxane, or a thermoplastic resin powder that contains the aforementioned platinum catalysts; rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX_3[(R)_2S]_3$, $(R^7_3P)_2Rh(CO)X^1$, $(R^7_3P)_2Rh(CO)H$, $Rh_2X^1_2Y_4$, $H_fRh_g olefin_h Cl_i$, $Rh(O(CO)R)_{3-n}(OH)_n$ where $X^1$ is hydrogen, chlorine, bromine or iodine, Y is an alkyl group, such as methyl or ethyl, CO, $C_8H_{14}$ or $0.5\,C_8H_{12}$, R is an alkyl radical, cycloalkyl radical or aryl radical and $R^7$ is an alkyl radical an aryl radical or an oxygen substituted radical, f is 0 or 1, g is 1 or 2, h is a whole number from 1 to 4 inclusive and i is 2, 3 or 4, n is 0 or 1. Any Iridium catalysts such as $Ir(OOCCH_3)_3$, $Ir(C_5H_7O_2)_3$, $[Ir(Z)(En)_2]_2$, or $(Ir(Z)(Dien))_2$, where Z is chlorine, bromine, iodine, or alkoxy, En is an olefin and Dien is cyclooctadiene may also be used. Preferably, this should be a platinum catalyst. In the addition-curable organopolysiloxane composition, the hydrosilylation catalyst should be used in an amount sufficient for curing the composition. If the hydrosilylation catalyst is a platinum catalyst, the platinum catalyst preferably should be used in an amount of 0.1 to 1000 ppm, and more preferably, in an amount of 0.1 to 100 ppm, in order to prevent coloring of the composition with platinum.

In addition to the aforementioned indispensable components, the first and second addition-curable organopolysiloxane compositions may be combined with various arbitrary additives that are used, e.g., for improving flowability of the composition or for improving mechanical strength of cured layers produced by curing the composition. Within the limits that are not in contradiction with the objects of the invention, the composition may be compounded with various fillers. Such fillers may be represented by precipitated silica, fumed silica, baked silica, fumed titanium oxide, or similar inorganic reinforcement fillers; ground quartz, diatomaceous earth, aluminosilicate, iron oxide, zinc oxide, calcium oxide, or similar inorganic non-reinforcement fillers; polymethacrylate resin, or similar organic fillers; or inorganic or organic fillers surface-treated with various organosilicon compounds, such as a hexamethyldisilazane, a trimethylchlorosilane, a polydimethylsiloxane, a polymethylhydrogensiloxane, etc. It is recommended that the filler have primary particle dimensions not exceeding 0.5 μm, preferably below 0.1 μm.

Preferably, the amount of additives should be controlled so that a light permeability index of a cured body obtained from the composition is no less than 80%. Typically, the aforementioned additives or fillers are used in an amount not exceeding 10 wt. %, preferably not exceeding 5 wt. %, and even more preferably, not exceeding 1 wt. % of the addition-curable organopolysiloxane composition. If for the layered silicone composite material permeability of light is a critical matter, an inorganic filler should not be used.

Other arbitrary components that can be added to the first and second addition-curable organopolysiloxane compositions can be represented by 3-methyl-1-butyn-3-ol, 3,5-dimethyl-1-hexyn-3-ol, 3-phenyl-1-butyn-3-ol, or similar alkyne alcohols; 3-methyl-3-penten-1-yn, 3,5-dimethyl-3-hexen-1-yn, or similar enyne compounds; 1,3,5,7-tetramethyl-1,3,5,7-tetravinylcyclotetrasiloxane, benzotriazole, or similar addition-reaction inhibitors. It is recommended that, in terms of weight units, the aforementioned addition-reaction inhibitors be used in an amount of 10 to 50,000 ppm.

Within the limits that are not in contradiction with the objects of the invention, the first and second addition-curable organopolysiloxane compositions can also be combined with other arbitrary components, such as dyes, pigments, flame retarders, solvents, etc.

The hardness of the first and second silicone layers obtained by curing the respective first and second addition-curable organopolysiloxane compositions can be appropriately adjusted with the use of methods known in the art by controlling the degree of cross-linking achieved via a reaction between alkenyl groups of component (A) or (A') and silicon-bonded hydrogen atoms of component (B). The hardness can also be controlled by appropriately selecting types and quantities of the below-described adhesion promoters or fillers.

In accordance with the invention, the first and second addition-curable organopolysiloxane compositions should be combined with the first and second adhesion promoters. The purpose of the first and second adhesion promoters is to provide firm adhesion and integration into a single body of the first and second silicone layers produced by curing the aforementioned first and second addition-curable organopolysiloxane compositions. Firm adhesion of the cured layers to each other with the use of the adhesion promoter improves transparency of the layered silicone composite material obtained by the method of the invention.

The aforementioned first and second adhesion promoters may be represented by organosilicon compounds having in one molecule at least one alkoxy group and/or alkoxyalkoxy group. The aforementioned adhesion promoters may be used individually or in combinations of various types. The alkoxy groups can be exemplified by methoxy groups, ethoxy groups, propoxy groups, and butoxy groups, of which the methoxy groups are preferable. The alkoxyalkoxy groups can be represented by methoxymethoxy groups, methoxyethoxy groups, ethoxymethoxy groups, and ethoxyethoxy groups. It is recommended that these alkoxy groups and/or alkoxyalkoxy groups be directly bonded to silicon atoms of the organosilicon compounds.

The groups other than the aforementioned alkoxyalkoxy groups and the alkoxy groups contained in the organosilicon compounds may be represented by substituted or non-substituted univalent hydrocarbon groups, such as methyl groups, ethyl groups, propyl groups, butyl groups, pethyl groups, hexyl groups, heptyl groups, or similar $C_1$-$C_{10}$ alkyl groups; cyclopentyl groups, cyclohexyl groups, or similar cycloalkyl groups; vinyl groups, allyl groups, butenyl groups, pentenyl groups, hexenyl groups, or similar alkenyl groups; phenyl groups, tolyl groups, xylyl groups, naphthyl groups, or similar aryl groups; benzyl groups, phenethyl groups, 3-phenylpropyl groups, or similar aralkyl groups; chloromethyl groups, 3-chloropropyl groups, 3,3,3-trifluoropropyl, nonafluorobutylethyl groups, or similar halogenated hydrocarbon groups; epoxy-containing univalent organic groups, such as 3-glycidoxypropyl groups, 4-glycidoxybutyl groups, or similar glycidoxy alkyl groups; 2-(3,4-epoxycyclohexyl) ethyl groups, 3-(3,4-epoxycyclohexyl) propyl groups, or similar epoxycyclohexylalkyl groups; 4-oxylanylbutyl groups, 8-oxylanyloctyl groups, or similar oxylanylalkyl groups; 3-methacryloxypropyl groups or similar acrylic groups, or other univalent organic groups; and hydrogen atoms.

The aforementioned organosilicon compounds may have groups other than alkoxy groups and/or alkoxyalkoxy groups that can be obtained due to the reaction with component (A) or component (B) of the first and second addition-curable organopolysiloxanes. Preferably, these should be silicon-bonded alkenyl groups and/or silicon-bonded hydrogen atoms. For better adhesion to substrates, the aforementioned organosilicon compound should contain at least one epoxy group per molecule. Preferably, this should be an epoxy-containing univalent organic group. Silicon-bonded alkenyl groups can be represented by the following groups directly bonded to silicon: vinyl groups, allyl groups, butenyl groups, pentenyl groups, hexenyl groups, or similar $C_2$-$C_{10}$ alkenyl groups, and alkenylaryl groups, such as styryl groups, of which vinyl groups are preferable.

The aforementioned organosilicon compounds may be represented by silane compounds, siloxane compounds, and polysiloxane compounds, or by mixtures of the aforementioned compounds. For example, this can be a mixture of polysiloxane compounds or siloxane compounds having, per molecule, at least one silicon-bonded alkenyl group, silicon-bonded hydrogen atom, and silicon-bonded alkoxy and alkoxyalkoxy group, respectively; or a mixture of a silane compound having, per molecule, at least one silicon-bonded alkoxy group or an alkoxyalkoxy group, a siloxane or a polysiloxane compound, and a silane compound having, per molecule, at least one silicon-bonded hydrogen atom and silicon bonded alkenyl group. The aforementioned silane compounds may constitute siloxane or polysiloxanes compounds having a linear, partially-branched linear, branched, cyclic, or net-like molecular structure. The linear, branched, and net-like structures are preferable.

The first and second adhesion promoters can be represented by organopolysiloxanes composed of units expressed by the following formula:

$R^8SiO_{3/2}$, $R^8R^9_jSiO_{(3-j)/2}$, $R^9_kR^{10}_lR^{11}_mSiO_{(4-k-l-m)/2}$,
and $R^{10}_oR^{11}_pSiO_{(4-o-p)/2}$ where $R^8$ is a univalent epoxy-containing organic group, $R^9$ is an alkoxy group, $R^{10}$ is a univalent hydrocarbon group, except for an alkenyl group, $R^{11}$ is an alkenyl group, "j" and "k" are 1 or 2, "l", "m", "o", and "p" are positive numbers equal to or lower than 2; (o+p) is a positive number equal to 1 or higher than 1, the share of $R^8$ in the entire amount of organic groups is 2 mole % or higher, the share of $R^9$ in the entire amount of organic groups is 5 mole % or higher, and the share of $R^{11}$ in the entire amount of organic groups is 2 mole % or higher.

Furthermore, the first and second adhesion promoters, may comprise a mixture of a polysiloxane represented by the following formula:

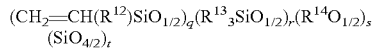

where $R^{12}$, $R^{13}$, and $R^{14}$ are univalent hydrocarbon groups, except for alkenyl groups, having 1 to 3 carbon atoms, "r" is 0 or a greater positive number, (q+r)/s is a number between 0.2 and 2, (q+r+s)/t is a number between 0.4 and 4, and "t" is a number not exceeding 30 with an alkoxysilane of the following formula:

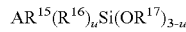

(where A is a glycidoxy group or an epoxycyclohexyl group, $R^{15}$ is a bivalent hydrocarbon group having 1 to 4 carbon atoms, $R^{16}$ and $R^{17}$ are univalent hydrocarbon groups, except for alkenyl groups, with 1 to 3 carbon atoms, and "u" is 1 or 0). In the above mixture, a ratio of the polysiloxane to alkoxysilane should be within the range of (1:10) to (10:1).

The following are more specific examples of the aforementioned organosilicon compounds: 3-glycidoxypropyltrimethoxysilane, 2-(3,4-epoxycyclohexyl) ethyltrimethoxysilane, 3-methacryloxypropyltrimethoxysilane, or similar silane compounds; a siloxane compound of the following formula (II)

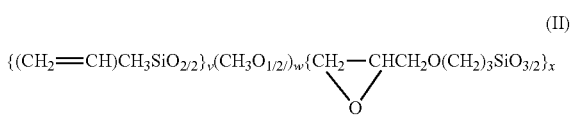

(where "v", "w", and "x" are positive numbers); a siloxane compound of the following formula (III):

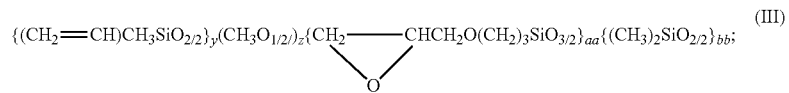

(where "y", "z", "aa", and "bb" are positive numbers); and a siloxane compound of the following formula (IV):

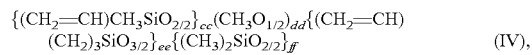

(where "cc", "dd", "ee"; and "ff" are positive number). Since the first and second layers should be firmly adhered to each other, it is recommended that the adhesion promoter used in the method of the invention contain epoxy groups.

Although there are no special restrictions with regard to viscosity of the first and second adhesion promoters, it preferable to have these agents in a low-viscous liquid state, and for this purpose the viscosity should be within the range of 1 to 500 mPa·s at 25° C.

The first and second adhesion promoters contained in the first and second addition-curable organopolysiloxane compositions, respectively, may be of the same or different types. The use of adhesion promoters of the same type is preferable from the point of view of better miscibility. Although there are no restrictions with regard to the amounts in which the first and second adhesion promoters can be used in the first and second addition-curable organopolysiloxane compositions, it is recommended to add them in an amount of 0.01 to 20 parts by weight, preferably 0.01 to 15 parts by weight, and even more preferably 0.01 to 10 parts by weight for each 100 parts by weight of the respective addition-curable organopolysiloxane compositions. It is advantageous to add the aforementioned adhesion promoters to the first organopolysiloxane composition in an amount of 0.5 to 20 parts by weight, preferably 0.5 to 15 parts by weight, and even more preferably 0.5 to 10 parts by weight for each 100 parts by weight of the composition.

The following description will relate to a layered silicone composite material of the present invention which comprises the first and second cured silicone layers obtained from the first and second addition-curable organopolysiloxane compositions that are cured with the use of the first and second adhesion promoters and laminated onto each other with a firm interconnection achieved due through the use of the aforementioned adhesion promoters. A layered silicone composite material of the present invention preferably should have a light permeability index exceeding 80% at 25° C.

The light permeability index was measured at 25° C. with the use of a spectrophotometer having a 1.0 mm-long light guide and operating on the 570 nm wavelength.

The first and second silicone layers of the layered silicone composite material of the invention have different hardness, i.e., the first silicone layer has a hardness of less than JIS A 50, while the second silicone layer has a hardness of JIS-A 50 or more. JIS A hardness can be easily measured by a method known to a person skilled in the art, in particular, in accordance with the procedure specified by JIS K 6253.

In the case that the layered silicone composite material is combined with a substrate, the latter can be attached to any of the layers, but preferably to the relatively soft first silicone layer. This is because the softness of the first silicone layer provides tighter contact between the layer and the substrate and because the second silicone layer that possesses a greater hardness may provide better protective properties when it remains on the outside.

The first and second adhesion promoters provide strong adhesion not only between the layers on their interface, but also demonstrate the effect of strong adhesion between the silicone layers and the substrate. Therefore, in case of connecting the layered silicone composite material of the invention to a substrate and in case of using the layered silicone composite material of the invention as a potting agent, it is possible to provide strong adhesion to the substrate and surrounding parts (e.g., a casing, etc.).

The method of manufacturing a layered silicone composite material of the invention comprises forming the aforementioned layered silicone composite material by applying and curing one of the silicone layers of the first or the second addition-curable organopolysiloxane compositions on top of another layer that has been obtained by spreading and curing the other of the aforementioned first or the second addition-curable organopolysiloxane compositions. Such a method results in stronger adhesion between the silicone layers than by merely adhering together several preliminarily cured silicone layers. Furthermore, since in the method of the invention the silicone layers can be prepared with a hardness controlled in each individual layer, the layered silicone composite material can be easily produced with a desired hardness distribution. Furthermore, since the first and second addition-curable organopolysiloxane compositions are cured separately at different times, the interface between the first and second layers is free of non-uniformities.

Although there are no special restrictions with regard to the temperature at which the first and the second addition-curable organopolysiloxane compositions have to be cured, it is recommended to conduct curing at temperatures between room temperature and 220° C. From the point of view of improved adhesion, it is recommended to cure the layers at 60 to 180° C., preferably at 80 to 150° C. When it is necessary to further improve adhesion between the layers or between the layer and a substrate, curing can be carried out in a stepwise manner by first curing the first or the second addition-curable organopolysiloxane compositions at room temperature to 100° C., preferably at 60 to 80° C., and then heating the layer at 80 to 180° C., preferably 100 to 150° C.

When it is required to combine the layered silicone composite material of the invention with another substrate, a first relatively soft silicone layer can be first formed by applying the first addition-curable silicone composition onto the substrate and curing the applied layer, and then a relatively hard layer is formed on the top of the first layer by applying the second addition-curable silicone composition onto the first layer and curing the second composition.

Although there are no special restrictions with regard to the thickness of the first and second silicone layers that form the layered silicone composite material of the invention, in those cases where permeability of light through the entire composite material is a critical matter, it is advantageous to make the layers relatively thin, e.g., with the thickness typically 0.1 to 20 mm, preferably 0.1 and 10 mm, and even more preferably, 0.1 and 1 mm. The layers may be the same or different in thickness.

When the layered silicone composite material of the invention has to be combined with a substrate, there are no special restrictions with regard to the material and shape of the substrate. The substrate may be made from metal, glass, quartz, or other inorganic materials, as well as from a thermosetting resin, thermoplastic resin, or other organic material, or may constitute a woven or non-woven fabric, porous substance, or another structural material. Regarding the shape, the substrates may be made in the form plates, rods, hemispheric or spherical bodies, etc. If necessary, the surface of the layered silicone material of the invention may be additionally coated with a transparent layer of an acrylic resin, or the like.

The layered silicone composite materials of the invention can be directly used as various parts of electric and electronic devices or medical products such as bandages. Furthermore, they can be used in combination with metal substrates, metal-oxide substrates, glass substrates, plastic films, or substrates of other types. Due to the fact that the layered silicone composite materials of the invention possess optical transparency, they are suitable for use as various light-permeable parts, such as parts of optical elements or as entire optical elements.

The aforementioned light-permeable parts suitable for the invention may be represented by parts that are designed for passing visible, infrared, ultraviolet rays, as well as X-rays, laser beams, etc.

More specifically, the layered silicone composite material of the invention may constitute substrates, light-conductive plates, prism sheets, polarization plates, phase difference plates, films for correcting the field-of-vision angle, polarizer protective films, or similar peripheral materials for liquid-crystal displays. It is anticipated that the material of the invention may find use in plasma display panel (PDP) as sealing agents, anti-reflective films, optical-correction films, materials for housings, front-glass protective films, and front-glass replacing materials. In the field of light-emitting diode (LED) displays, the layered silicone composite material of the invention may find use for molding parts of LEDs, such as a sealing agent for LEDs, front-glass protective films, and front-glass replacing materials. In plasma-address liquid crystal displays (PALC), the layered silicone composite material of the invention may find use as a material for substrates, light-guide plates, prism sheets, polarization plates, phase difference plates, films for correcting the field-of-vision angle, and polarizer protective films. Other applications include materials for organic EL (electroluminescence) displays as front glass protective films, front glass replacement materials; in field-emission displays (FED), the layered silicone composite material can be used for various film substrates, front-glass protective films, and front-glass replacement materials.

In the field of optical recording, the layered silicone composite material of the invention can be used as disc substrate material for VD (video discs), CD/CD-ROM, CD-R/RW, DVD-R/DVD-RAM, MO/MD, PD (phase-change disc), optical cards, etc., as well as for pick-up lenses, protective films, sealing agents, etc.

In the field of optical part manufacturing, the layered silicone composite material of the invention can be used in still cameras as a lens material, finder prisms, target prisms, finder covers, and light receiving sensor elements; in video cameras, the material can be used for projection lenses and finders; in projection TV, the material can be used for projection lenses, protective films, sealing agents, and adhesives; in optical sensing mechanisms, the material can be used for manufacturing lenses, sealing agents, films, etc.; in optical communication systems, the material may be used for finders of optical switch peripherals, as well as materials for lenses, light guides, sealers for optical elements, etc.; in optical connector peripherals, the material may find use for manufacturing optical fibers, ferrules, or as sealing agents. In moveable parts of light-receiving devices and in optical circuits, the material can be used for lenses, light guides, and sealing agents for light-emitting elements. In peripheral devices of optoelectronic integrated circuits (OEIC), the layered silicone composite material can be used for substrates, finders, and sealing agents of optical elements. Finally, the composite material can be used for light guiding and illumination of optical fiber decorative displays, various industrial sensors, indicators, and signs.

In the construction field, the layered silicone composite material may find application in the manufacturing of various interior materials and materials for mechanical treatment, electric covers, sheets, glass intermediate films, glass replacement parts, and materials for peripherals of solar batteries. In agriculture, the materials of the invention can be used as coating films for housings.

For use as organic materials with optoelectronic properties that may be required for devices of next generation, the layered silicone composite material of the invention may find application as an organic material for EL element peripherals, organic photorefractive elements, materials for photo-amplifiers and photo-multipliers of optoelectronic converters, organic substrates materials of solar battery peripherals, fiber materials, and sealing agents of various elements.

Examples of the most favorable applications are diodes of semiconductor devices, LEDs, photo couplers, and CCDs. In view of a high light permeability index, the layered silicone composite material of the invention is most suitable for light-permeable parts of photo couplers, LEDs, or other light-emitting elements.

EXAMPLES

The invention will be further described in more detail with reference to practical and comparative examples. It is understood that the scope of application of the invention is not limited by the aforementioned practical examples. The light permeability index and hardness were measured by the methods described below.

[Method for Measuring Hardness of Cured Bodies Obtained from the Addition-Curable Organopolysiloxane Compositions]

Hardness of cured bodies obtained by heating and curing the addition-curable organopolysiloxane compositions for 1 hour in an oven at 150° C. was measured in accordance with the provisions of JIS K 6253.

[Measurement of Light Permeability Indices of Addition-Curable Organopolysiloxane Compositions and Cured Bodies Obtained Therefrom]

Light permeability indices of the addition-curable organopolysiloxane compositions at 25° C. were measured at 570 nm with the use of an automatic spectrophotometer (1.0 mm light-guide length) capable of operating at a selected wavelength of a visible light (200 nm to 700 nm). Similarly, light permeability indices were measured (1.0 mm light-guide length) at 570 nm wavelength and at temperature of 25° C. in cured bodies obtained by curing the addition-curable organopolysiloxane compositions for 1 hour at 150° C. in a hot-air circulation oven with subsequent final heat treatment for 100 hours in the hot-air circulation oven.

[Measurement of Light Permeability Indices of Layered Silicone Composites]

The first addition-curable organopolysiloxane composition intended for forming the first silicone layer was applied onto a quartz plate in the form of a 0.5 mm thick layer, and then the first silicone layer was obtained by curing the composition for 1 hour at 150° C. The obtained cured layer was coated with a 0.5 mm thick layer of the second addition-curable organopolysiloxane composition intended for forming the second cured silicone layer. The uncured second silicone layer was laminated with a quartz plate and then thermally cured by heating for 1 hour at 150° C. As a result, a layered silicone composite material sample consisting of two silicone layers sandwiched between two quartz plates was obtained. Samples produced by the aforementioned method were subject to measurement of light permeability indices at 25° C. and at the 570 nm wavelength in the same manner as has been described above.

[Method for Evaluating Adhesion (1) Between the First and Second Silicone Layers]

The first addition-curable organopolysiloxane composition that forms the first silicone layer was applied onto a 50 mm-diameter aluminum disk until thickness of the layer reached 8 mm, and the coating was then heated and cured for 1 hour in an oven at 150° C. The cured layer was cooled and coated with the second addition-curable organopolysiloxane composition that forms the second silicone layer until thickness of the layer reached 8 mm. The obtained composite material was heated and cured under different conditions for obtaining layered silicone composite material samples. The samples were cooled to room temperature, and then the adhesion strength (1) was evaluated by using criteria given below as a degree of resistance to peeling on the side of the second layer with a finger:

⊚—cohesive disconnection of the first silicone layer;
○—adhesion is strong but if one tries it deliberately, the layers may be partially separated over the interface;
△—resistance to peeling is felt, but separation is carried out over the interface;
X—resistance to peeling is weak, and the layers are easily separated over the interface.

[Method for Evaluating Adhesion (2) Between the First and Second Silicone Layers]

The first addition-curable organopolysiloxane composition that forms the first silicone layer was applied onto a 5 mm-thick glass plate until thickness of the layer reached 5 mm, and the coating was then heated and cured for 1 hour in an oven at 150° C. The cured layer was cooled and coated with the second addition-curable organopolysiloxane composition that forms the second silicone layer until thickness of the layer reached 5 mm. The obtained composite material was heated and cured for 1 hour in an oven at 150° C. As a result, a layered composite material consisting of the first and second silicone layers was produced. The obtained material was cooled to room temperature and then was dipped for 10 min. into a liquid dry-ice/acetone mixture and for 10 min. into a 60° C. silicone oil bath. Dipping was carried out with one cycle and with five cycles. Upon completion of the dipping treatment, the samples were evaluated with regard to adhesion strength between the silicone layer and glass and between the silicone layers. The following criteria were used:

⊚—cohesive disconnection of the first silicone layer;
○—adhesion is strong but if one tries it deliberately, the layers may be partially separated over the interface;
Δ—resistance to peeling is felt, but separation is carried out over the interface;
X—resistance to peeling is weak, and the layers are easily separated over the interface by pulling or separated themselves naturally during the test.

Reference Example 1

Addition-Curable Organopolysiloxane Composition No. 1

A uniform mixture was prepared from the following components: 97.2 parts by weight of a dimethylpolysiloxane capped on both molecular terminals with dimethylvinylsiloxy groups and having a viscosity of 11,000 mPa·s; 0.55 parts by weight of a dimethylsiloxane-methylhydrogensiloxane copolymer capped at both molecular terminals with trimethylsiloxy groups and having a viscosity of 15 mPa·s (content of silicon-bonded hydrogen was 1.6 wt. %; a mole ratio of the silicon-bonded hydrogen of the copolymer to the silicon-bonded vinyl groups of the dimethylpolysiloxane capped at both molecular terminals with dimethylvinylsiloxy groups was 1.5); a platinum-1,3-divinyl-1,1,3,3-tetramethyldisiloxane complex (the content of metallic platinum in the complex in terms of weight units was 2.5 ppm per total weight of the addition-curable organopolysiloxane composition); 1 part by weight of an adhesion promoter represented by the following formula:

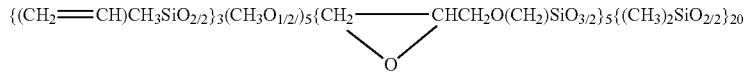

and an addition-reaction inhibitor in the form of 3-phenyl-1-butyn-3-ol (in an amount in weight unit equal to 200 ppm per total weight of the thermosetting liquid organopolysiloxane composition). As a result, addition-curable organopolysiloxane composition No. 1 was prepared. A cured body obtained by heating and curing the aforementioned composition for 1 hour at 150° C. had hardness equal to JIS A 20 and a light permeability index equal to 86%.

Reference Example 2

Addition-Curable Organopolysiloxane Composition No. 2

Addition-curable organopolysiloxane composition No. 2 was prepared by the same method as in Reference Example 1, with the exception that the adhesion promoter was used in an amount of 0.5 parts by weight. A cured body obtained by heating and curing the aforementioned composition for 1 hour at 150° C. had hardness equal to JIS A 20 and a light permeability index equal to 98%.

Reference Example 3

Addition-Curable Organopolysiloxane Composition No. 3

Addition-curable organopolysiloxane composition No. 3 was prepared by the same method as in Reference Example 1, with the exception that the adhesion promoter expressed by the formula given below was used in an amount of 0.5 parts by weight.

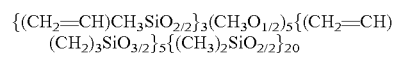

$\{(CH_2=CH)CH_3SiO_{2/2}\}_3(CH_3O_{1/2})_5\{(CH_2=CH)(CH_2)_3SiO_{3/2}\}_5\{(CH_3)_2SiO_{2/2}\}_{20}$

A cured body obtained by heating and curing the aforementioned composition for 1 hour at 150° C. had hardness equal to JIS A 18 and a light permeability index equal to 100%.

Reference Example 4

Addition-Curable Organopolysiloxane Composition No. 4

Addition-curable organopolysiloxane composition No. 4 was prepared by the same method as in Reference Example 1, with the exception that the adhesion promoter was not used. A cured body obtained by heating and curing the aforementioned composition for 1 hour at 150° C. had hardness equal to JIS A 16 and a light permeability index equal to 100%.

Reference Example 5

Addition-Curable Organopolysiloxane Composition No. 5

A uniform mixture was prepared from the following components: 22.5 parts by weight of a dimethylpolysiloxane capped on both molecular terminals with dimethylvinylsiloxy groups and having a viscosity of 44,000 mPa·s; 33.4 parts by weight of a dimethylpolysiloxane capped on both molecular terminals with dimethylvinylsiloxy groups and having a viscosity of 500 Pa·s; 20 parts by weight of a methylvinylpolysiloxane (vinyl content of 5 wt. %) composed of $(Me_2ViSiO_{1/2})$ units, $(Me_3SiO_{1/2})$ units, and $(SiO_{4/2})$ units used in a ratio of 15:50:35; 16.7 parts by weight of a methylvinylpolysiloxane (vinyl content of 2 wt. %) composed of $(Me_2ViSiO_{1/2})$ units, $(Me_3SiO_{1/2})$ units, and $(SiO_{4/2})$ units used in a ratio of 2:43:55; 5.75 parts by weight of a dimethylsiloxane-methylhydrogen-siloxane copolymer capped at both molecular terminals with trimethylsiloxy groups and having a viscosity of 15 mPa·s (content of silicon-bonded hydrogen was 1.6 wt. %);
a platinum-1,3-divinyl-1,1,3,3-tetramethyldisiloxane complex (the content of metallic platinum in the complex in terms of weight units was 2.5 ppm per total weight of the addition-curable organopolysiloxane composition); 0.5 parts by weight of the adhesion promoter in Reference Example 1; and 3-phenyl-1-butyn-3-ol as an addition-reaction inhibitor (in an amount in weight units equal to 500 ppm per total weight of the thermosetting organopolysiloxane composition). As a result, addition-curable organopolysiloxane composition No. 5 was prepared. A cured body obtained by heating and curing the aforementioned composition for 1 hour at 150° C. had hardness equal to JIS A 65 and a light permeability index equal to 97%.

Reference Example 6

Addition-Curable Organopolysiloxane Composition No. 6

Addition-curable organopolysiloxane composition No. 6 was prepared by the same method as in Reference Example 5, with the exception that the adhesion promoter was not used. A cured body obtained by heating and curing the aforementioned composition for 1 hour at 150° C. had hardness equal to JIS A 63 and a light permeability index equal to 100%.

Reference Example 7

Addition-Curable Organopolysiloxane Composition No. 7

39 parts by weight of an organopolysiloxane having a partially-branched molecular structure and represented by the following formula:

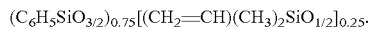

(the aforementioned organopolysiloxane is solid at 25° C., contains 20 mole % of silicon-bonded vinyl groups per total amount of silicon-bonded organic groups, contains 50 mole % of silicone-bonded phenyl groups per total amount of silicon-bonded organic groups, and has a weight-average molecular weight recalculated for polystyrene equal to 1600) were liquefied by heating to 120° C. and mixed with 11 parts by weight of tris (dimethylvinylsilyl) phenyl silane of the following formula:

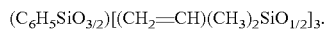

The obtained mixture was cooled to room temperature and mixed in a liquid form with 49 parts by weight of a methylphenylpolysiloxane capped at both molecular terminals with dimethylhydrogensiloxy groups and expressed by the following formula:

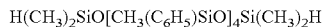

a platinum-1,3-divinyl-1,1,3,3-tetramethyldisiloxane complex (the content of metallic platinum in the complex in terms of weight units was 2.5 per total weight of the addition-curable organopolysiloxane composition), 0.9 parts by weight of the adhesion promoter in Reference Example 1 and 0.1 part by weight of ethynylcyclohexanol. As a result, liquid addition-curable organopolysiloxane composition No. 7 was prepared. A cured body obtained by heating and curing the aforementioned composition for 1 hour at 150° C. had a hardness equal to JIS A 75 and a light permeability index equal to 98%.

Practical Example 1

A layered silicone composite material was produced by coating the first cured silicone layer obtained from addition-curable organopolysiloxane No. 1 prepared in Reference Example 1 with addition-curable organopolysiloxane composition No. 5 prepared in Reference Example 5. The coating was then heated and cured for forming the second cured siloxane layer. The obtained layered silicone composite material was evaluated by the methods described above with regard to the light permeability index and various adhesion characteristics. The results of the evaluation are shown in Table 1. All compositions were heated and cured for 1 hour at 150° C.

Practical Example 2

A layered silicone composite material was produced and its characteristics were evaluated by the same methods as in Practical Example 1, with the exception that heating for 1 hour at 150° C. was conducted after heating and curing addition-curable organopolysiloxane composition No. 5 obtained in Reference Example 5 for 1 hour at 120° C. The characteristics were evaluated by the same methods as in Practical Example 1. The results of the evaluation are shown in Table 1.

Practical Example 3

A layered silicone composite material was produced and its characteristics were evaluated by the same methods as in Practical Example 1, with the exception that heating for 1 hour at 150° C. was conducted after heating and curing addition-curable organopolysiloxane composition No. 5 obtained in Reference Example 5 for 1 hour at 80° C. The characteristics were evaluated by the same methods as in Practical Example 1. The results of the evaluation are shown in Table 1.

Practical Example 4

A layered silicone composite material was produced by the same method as in Practical Example 1, with the exception that the addition-curable organopolysiloxane composition No. 1 obtained in Reference Example 1 was replaced by addition-curable organopolysiloxane composition No. 2 obtained in Reference Example 2. The characteristics were evaluated by the same methods as in Practical Example 1. The results of the evaluation are shown in Table 1.

Practical Example 5

A layered silicone composite material was produced by the same method as in Practical Example 1, with the exception that the addition-curable organopolysiloxane composition No. 1 obtained in Reference Example 1 was replaced by addition-curable organopolysiloxane composition No. 3 obtained in Reference Example 3. The characteristics were evaluated by the same methods as in Practical Example 1. The results of the evaluation are shown in Table 1.

Practical Example 6

A layered silicone composite material was produced by the same method as in Practical Example 1, with the exception that the addition-curable organopolysiloxane composition No. 5 obtained in Reference Example 5 was replaced by addition-curable organopolysiloxane composition No. 7 obtained in Reference Example 7. The characteristics were evaluated by the same methods as in Practical Example 1. The results of the evaluation are shown in Table 1.

Comparative Example 1

A layered silicone composite material was produced by the same method as in Practical Example 1, with the exception that the addition-curable organopolysiloxane composition No. 5 obtained in Reference Example 5 was replaced by addition-curable organopolysiloxane composition No. 6 obtained in Reference Example 6 without the use of the adhesion promoter. The characteristics were evaluated by the same methods as in Practical Example 1. The results of the evaluation are shown in Table 1.

Comparative Example 2

A layered silicone composite material was produced by the same method as in Practical Example 1, with the exception that the addition-curable organopolysiloxane composition No. 1 obtained in Reference Example 1 was replaced by addition-curable organopolysiloxane composition No. 4 obtained in Reference Example 4 without the use of the adhesion promoter. The characteristics were evaluated by the same methods as in Practical Example 1. The results of the evaluation are shown in Table 1.

Comparative Example 3

A layered silicone composite material was produced by the same method as in Practical Example 1, with the exception that the addition-curable organopolysiloxane composition No. 1 obtained in Reference Example 1 was replaced by addition-curable organopolysiloxane composition No. 4 obtained in Reference Example 4 without the use of the adhesion promoter and that the addition-curable organopolysiloxane composition No. 5 obtained in Reference Example 5 was replaced by addition-curable organopolysiloxane composition No. 6 obtained in Reference Example 6 without the use of the adhesion promoter. The characteristics were evaluated by the same methods as in Practical Example 1. The results of the evaluation are shown in Table 1.

TABLE 1

|  | Practical Examples | | | | | | Comp. Examples | | |
| --- | --- | --- | --- | --- | --- | --- | --- | --- | --- |
|  | 1 | 2 | 3 | 4 | 5 | 6 | 1 | 2 | 3 |
| Light permeability index 1 h (%) | 93 | 93 | 93 | 92 | 92 | 93 | 93 | 93 | 93 |
| Light permeability index 100 h (%) | 88 | 88 | 88 | 86 | 87 | 88 | NA[1] | NA[1] | NA[1] |
| Adhesion (1) between the silicone layers | ○ | ◎ | ◎ | ○ | ○ | ○ | Δ | X | X |
| Adhesion (2) between the silicone layers | ○ | ◎ | ◎ | ○ | Δ | ○ | X | X | X |
| Adhesion (2) to glass substrate | ◎ | ◎ | ◎ | ◎ | Δ | ◎ | ◎ | X | X |

[1]Measurements were impossible as the silicone layers separated during 100 h heat-treatment.

The invention claimed is:

1. A method of manufacturing a layered silicone composite material comprising the steps of:
    applying a first addition-curable organopolysiloxane composition that contains (A) an organopolysiloxane having an average of at least two silicon-bonded alkenyl groups per molecule, (B) an organopolysiloxane having an average of at least two silicon-bonded hydrogen atoms per molecule, (C) a hydrosilylation catalyst for addition reactions, a first adhesion promoter, and optional additives selected from the group of fillers, addition-reaction inhibitors, dyes, pigments, flame retardants, and solvents onto a second silicone layer that is formed by curing a second addition-curable organopolysiloxane composition containing (A') an organopolysiloxane having an average of at least two silicon-bonded alkenyl groups per molecule, (B) an organopolysiloxane having an average of at least two silicon-bonded hydrogen atoms per molecule, (C) a hydrosilylation catalyst for addition reactions, a second adhesion promoter, and optional additives selected from the group consisting of fillers, addition-reaction inhibitors, dyes, pigments, flame retardants, and solvents, and where the second silicone layer has a hardness of JIS A 50 or more; and
    forming a first silicone layer that has a hardness of less than JIS A 50 by curing said first addition-curable organopolysiloxane composition;
    wherein at least one of the first adhesion promoter and the second adhesion promoter is an organosilicon compound containing, per molecule, at least one silicon-bonded alkenyl group and at least one epoxy group.

2. The method according to claim 1, where at least one of the first addition-curable organopolysiloxane composition and the second addition-curable organopolysiloxane composition is free of inorganic filler.

3. The method according to claim 1, where the layered silicone composite material is an optically transparent material.

4. The method according to claim 3, where the layered silicone composite material has a light permeability index exceeding 80% at 25° C.

5. The method according to claim 1, where the layered silicone composite material is a part of an optical element.

6. The method according to claim 1, where both of the first adhesion promoter and the second adhesion promoter are an organosilicon compound each individually containing, per molecule, at least one silicon-bonded alkenyl group and at least one epoxy group.

7. The method according to claim 6, where at least one of the first adhesion promoter and the second adhesion promoter further contains, per molecule, at least one alkoxy group, at least one alkoxyalkoxy group, or both.

8. The method according to claim 7, where both of the first adhesion promoter and the second adhesion promoter further contain, per molecule, at least one alkoxy group, at least one alkoxyalkoxy group, or both.

9. The method according to claim 7, where at least one of the first adhesion promoter and the second adhesion promoter further contains, per molecule, at least one silicon-bonded hydrogen atom.

* * * * *